United States Patent
Lee et al.

(10) Patent No.: US 8,933,898 B2
(45) Date of Patent: Jan. 13, 2015

(54) TOUCH SENSOR INTEGRATED TYPE DISPLAY DEVICE

(75) Inventors: Buyeol Lee, Gyeonggi-do (KR); Hyein Han, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 256 days.

(21) Appl. No.: 13/337,375

(22) Filed: Dec. 27, 2011

(65) Prior Publication Data

US 2012/0249444 A1 Oct. 4, 2012

(30) Foreign Application Priority Data

Apr. 1, 2011 (KR) .......... 10-2011-0030314

(51) Int. Cl.
- *G06F 3/041* (2006.01)
- *G06F 3/044* (2006.01)
- *G02F 1/1333* (2006.01)
- *G02F 1/1343* (2006.01)

(52) U.S. Cl.
CPC .............. *G06F 3/0412* (2013.01); *G06F 3/044* (2013.01); *G02F 1/13338* (2013.01); *G02F 2001/134372* (2013.01); *G06F 2203/04103* (2013.01)
USPC ............................ 345/173; 349/129; 345/174

(58) Field of Classification Search
CPC .............. G06F 3/041; G02F 1/133753; G02F 1/134363; G02F 2001/134318
See application file for complete search history.

(56) References Cited

U.S. PATENT DOCUMENTS

| | | | |
|---|---|---|---|
| 2004/0125296 A1* | 7/2004 | Sasabayashi | 349/129 |
| 2008/0062139 A1 | 3/2008 | Hotelling et al. | |
| 2009/0002336 A1* | 1/2009 | Choi et al. | 345/174 |
| 2010/0194707 A1* | 8/2010 | Hotelling et al. | 345/173 |
| 2010/0265210 A1 | 10/2010 | Nakanishi et al. | |
| 2010/0302202 A1* | 12/2010 | Takeuchi et al. | 345/174 |
| 2012/0162584 A1* | 6/2012 | Chang et al. | 349/106 |

FOREIGN PATENT DOCUMENTS

| | | |
|---|---|---|
| EP | 2 141 573 | 1/2010 |
| WO | 2010/088670 | 8/2010 |

OTHER PUBLICATIONS

European Search report for European Application No. 11195605.8 dated Sep. 12, 2013.

* cited by examiner

*Primary Examiner* — Dwayne Bost
*Assistant Examiner* — Gerald Johnson
(74) *Attorney, Agent, or Firm* — Morgan, Lewis & Bockius LLP

(57) ABSTRACT

A touch sensor integrated type display device includes gate lines and data lines, which are formed on a substrate to cross each other, a plurality of pixel electrodes formed in areas defined by the crossing of the gate lines and the data lines, a common electrode including at least two touch driving electrodes, which overlap the pixel electrodes with an insulating layer interposed between them, and at least one touch sensing electrode, which is disposed adjacent to the at least two touch driving electrodes, first signal lines which are connected to the at least two touch driving electrodes and are arranged parallel to one another in a first direction, and a second signal line which is connected to the at least one touch sensing electrode and is arranged parallel to the first signal lines in the first direction.

17 Claims, 9 Drawing Sheets

TOUCH SENSOR INTEGRATED TYPE DISPLAY DEVICE

This application claims the benefit of Korean Patent Application No. 10-2011-0030314 filed on Apr. 1, 2011, the entire contents of which is incorporated herein by reference for all purposes as if fully set forth herein.

BACKGROUND OF THE INVENTION

1. Field of the Invention

Embodiments of the invention relate to a touch sensor integrated type display device.

2. Discussion of the Related Art

A touch sensor is installed in display devices such as a liquid crystal display, a field emission display, a plasma display panel, an electroluminescent display, and an electrophoresis display. The touch sensor is a kind of input device capable of inputting predetermined information when a user watching an image display device presses or touches a touch panel,.

The touch sensor used in the display devices may be classified into an add-on type touch sensor, an on-cell type touch sensor, and an integrated type (or in-cell type) touch sensor depending on its structure. The add-on type touch sensor is configured such that the display device and the add-on type touch sensor are individually manufactured and then the add-on type touch sensor is attached to an upper substrate of the display device. The on-cell type touch sensor is configured such that components constituting the on-cell type touch sensor are directly formed on the surface of an upper glass substrate of the display device. The in-cell type touch sensor is configured such that the in-cell type touch sensor is mounted inside the display device to thereby achieve thin profile of the display device and to increase the durability of the display device.

However, because the add-on type touch sensor has the structure in which the completed add-on type touch sensor is mounted on the display device, a thickness of the display device increases. Further, the visibility of the display device is reduced because of a reduction in a brightness of the display device. Because the on-cell type touch sensor has the structure in which the on-cell type touch sensor is formed on the surface of the glass substrate of the display device, the on-cell type touch sensor shares the glass substrate with the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer, which constitute the on-cell type touch sensor. Further, the number of processes and the manufacturing cost in the on-cell type touch sensor increase.

The in-cell type touch sensor can solve the problems generated in the add-on type touch sensor and the on-cell type touch sensor because of the advantages of the thin profile and the durability improvement. Examples of the in-cell type touch sensor include a light type touch sensor, a capacitive type touch sensor, etc.

In the light type touch sensor, a light sensing layer is formed on a thin film transistor (TFT) array substrate of the display device, and it is possible to recognize light reflected by an object existing in a touched portion using light or infrared light from a backlight unit. The light type touch sensor shows a relatively stable driving performance in dark surroundings, but light stronger than the reflected light acts as a noise in bright surroundings. The light type touch sensor may erroneously recognize a non-touch operation as an touch operation even surroundings are slightly bright because an intensity of light reflected by the actual touch operation is very weak. In particular, the light type touch sensor may not recognize the touch operation because an intensity of light in the surroundings exposed to solar light is very strong.

Examples of the capacitive type touch sensor include a self capacitive type touch sensor and a mutual capacitive type touch sensor. The mutual capacitive type touch sensor divides a common electrode of a display device into touch driving electrode regions and touch sensing electrode regions to form mutual capacitances between the touch driving electrode regions and the touch sensing electrode regions. Hence, the mutual capacitive type touch sensor measures changes in the mutual capacitances generated in a touch operation, thereby recognizing the touch operation.

In the mutual capacitive type touch sensor, a common electrode is divided into a plurality of touch cells formed on the same layer, and each of the touch cells is divided into a touch driving electrode and a touch sensing electrode. As mentioned above, because the touch driving electrodes and the touch sensing electrodes are formed on the same layer, touch driving lines for connecting the touch driving electrodes and touch sensing lines for connecting the touch sensing electrodes are necessary so that the touch driving electrodes do not contact the touch sensing electrodes. For this, in the related art, the touch driving lines were formed of the same metal as gate lines when the gate lines of the display device were formed, thereby connecting the touch driving electrodes to one another in a x-axis direction. Further, the touch sensing lines were formed of metal formed on a layer different from the formation layer of the touch driving lines, the touch driving electrodes, and the touch sensing electrodes, thereby connecting the touch sensing electrodes to one another in a y-axis direction.

However, when the touch driving lines and the touch sensing lines were formed on the different layers, the design of a TFT array was complicated, and a bezel width of the display device increased because of the left-right line design of the touch driving lines.

Accordingly, the need of a touch sensor integrated type display device capable of solving the problems of the above-described kinds of touch sensors was on the rise.

SUMMARY OF THE INVENTION

Embodiments of the invention provide a touch sensor integrated type display device capable of reducing its thickness and improving the durability by sharing a touch sensing element for recognizing a touch operation with a component of a display device.

Embodiments of the invention provide a touch sensor integrated type display device capable of simplifying the design of a thin film transistor array and preventing an increase in a bezel width resulting from touch driving lines for connecting touch driving electrodes.

In one aspect, there is a touch sensor integrated type display device comprising gate lines and data lines which are formed on a substrate to cross over each other, a plurality of pixel electrodes formed in areas defined by the crossing of the gate lines and the data lines, a common electrode including at least two touch driving electrodes, which overlap the plurality of pixel electrodes with an insulating layer interposed between them, and at least one touch sensing electrode, which is disposed adjacent to the at least two touch driving electrodes, first signal lines which are respectively connected to the at least two touch driving electrodes and are arranged parallel to one another in a first direction, and a second signal line which is connected to the at least one touch sensing electrode and is arranged parallel to the first signal lines in the first direction.

The touch sensor integrated type display device further comprises a third signal line which is formed in a second direction crossing the first signal lines and is connected to the first signal lines, a fourth signal line which is formed parallel to the third signal line and is connected to the second signal line, and touch pads respectively connected to the third and fourth signal lines.

In another aspect, there is a touch sensor integrated type display device comprising a gate line formed on a substrate, a gate insulating layer formed on an entire surface of the substrate on which the gate line is formed, a data line which is formed on the gate insulating layer to cross over the gate line, a thin film transistor which is formed on the gate insulating layer and has a source electrode connected to the data line, a plurality of first signal lines which are formed on the gate insulating layer without contacting the data line, a pixel electrode which is formed on the gate insulating layer in an area defined by the crossing of the gate line and the data line and is connected to a drain electrode of the thin film transistor, an interlayer dielectric layer formed on the gate insulating layer on which the data line, the thin film transistor, the plurality of first signal lines, and the pixel electrode are formed, and a common electrode which is formed on the interlayer dielectric layer and is connected to the plurality of first signal lines through a contact hole formed on the interlayer dielectric layer, wherein the common electrode includes at least two touch driving electrodes and at least one touch sensing electrode, wherein the plurality of first signal lines include touch driving signal lines connected to the at least two touch driving electrodes and are arranged parallel to one another in a first direction, and a touch sensing line connected to the at least one touch sensing electrode.

The touch sensor integrated type display device further comprises a second signal line which is formed in a second direction crossing the plurality of first signal lines and is connected to the touch driving signal lines, and a third signal line which is formed parallel to the second signal line and is connected to the touch sensing line.

The at least two touch driving electrodes and the at least one touch sensing electrode each have a size corresponding to at least two pixel electrodes.

The pixel electrode includes a plurality of openings, which elongate in an area overlapping the touch driving electrode and the touch sensing electrode to be spaced apart from at a predetermined distance. The touch driving electrode and the touch sensing electrode each include a plurality of openings, which elongate in an area overlapping the pixel electrode to be spaced apart from at a predetermined distance.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
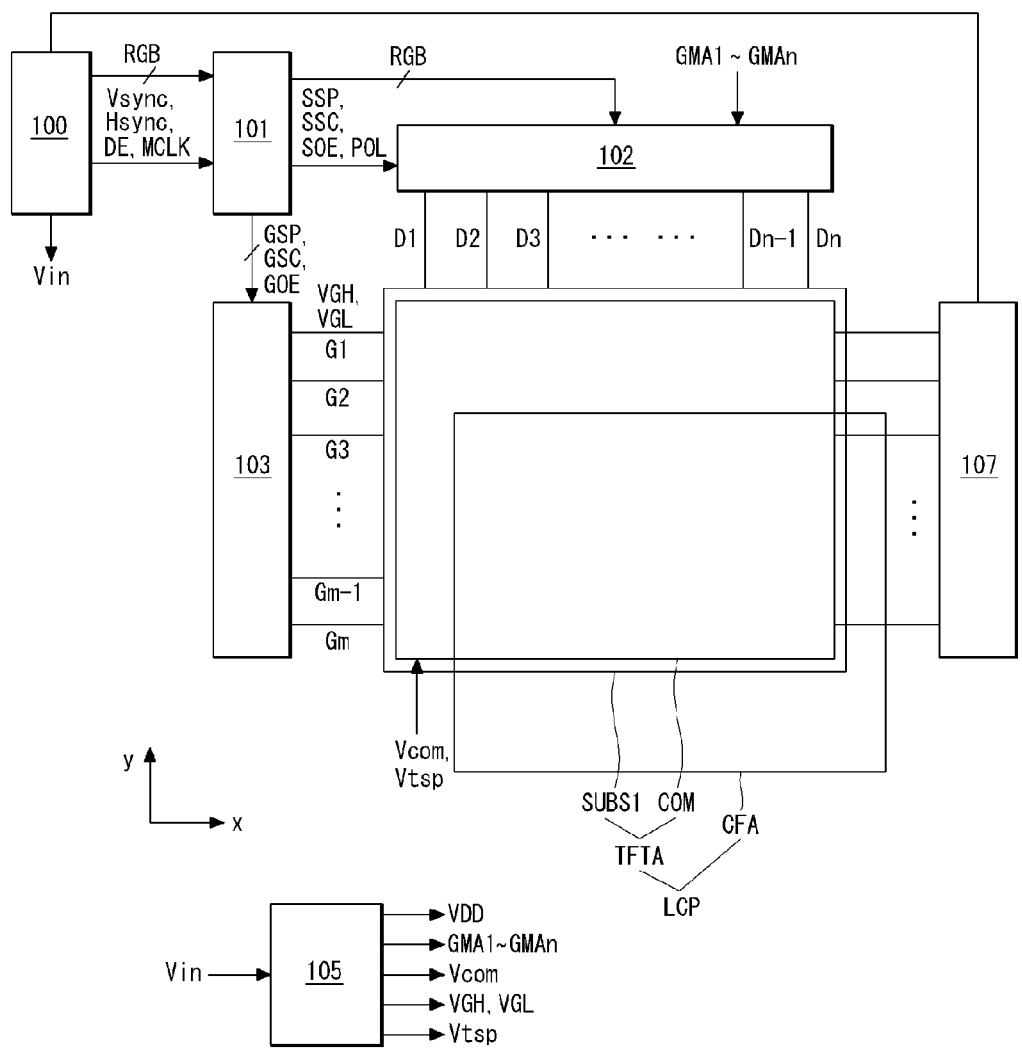
FIG. 1 schematically illustrates a touch sensor integrated type display device according to an example embodiment of the invention.

Hereinafter, embodiments of this document will be described in greater detail with reference to the accompanying drawings, wherein the same reference numerals may be used to denote the same or substantially the same elements throughout the specification and the drawings.

Figure 2:
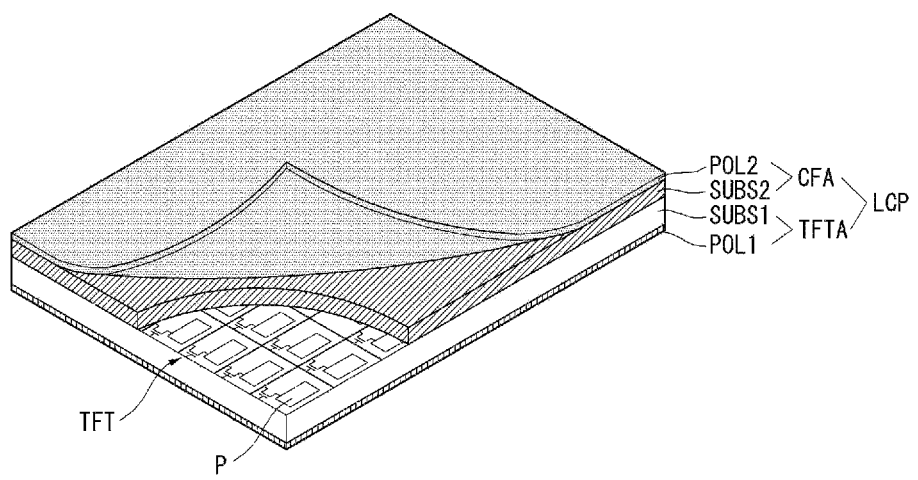
FIG. 2 is a partial exploded perspective view schematically showing a display panel shown in FIG. 1.
Figure 3:
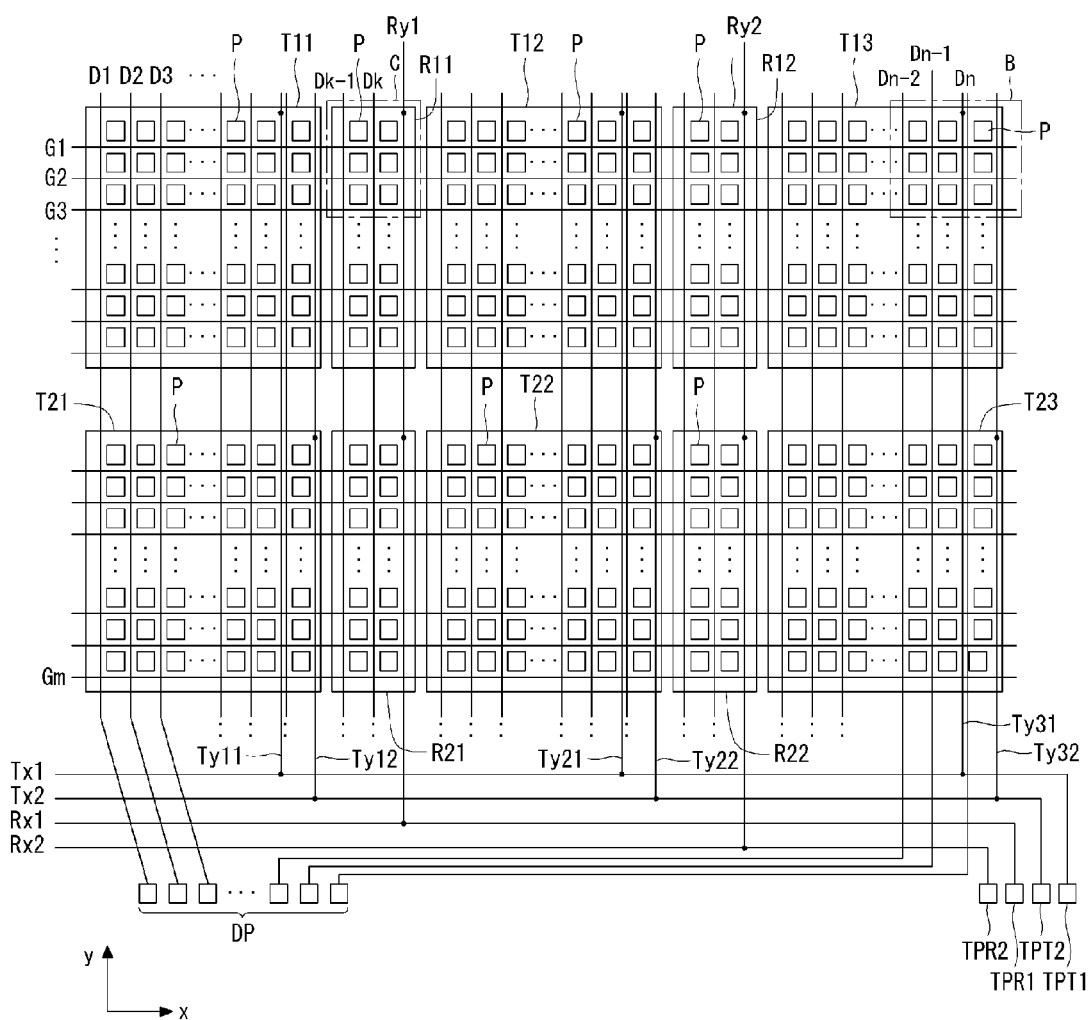
FIG. 3 a plane view schematically illustrating a relationship between a common electrode (i.e., touch driving electrodes and touch sensing electrodes), pixel electrodes, and lines of a touch sensor integrated type display device according to an example embodiment of the invention.

A touch sensor integrated type display device according to an example embodiment of the invention is described in detail with reference to FIGS. 1 to 3. FIG. 1 schematically illustrates a touch sensor integrated type display device according to an example embodiment of the invention. FIG. 2 is a partial exploded perspective view schematically showing a display panel shown in FIG. 1. FIG. 3 is a plane view schematically illustrating a relationship between a common electrode (i.e., touch driving electrodes and touch sensing electrodes), pixel electrodes, and lines of the touch sensor integrated type display device according to the example embodiment of the invention.

In the following description, a touch sensor integrated type liquid crystal display is used as an example of the touch sensor integrated type display device.

As shown in FIGS. 1 and 2, the touch sensor integrated type liquid crystal display according to the embodiment of the invention includes a liquid crystal display panel LCP, a host controller 100, a timing controller 101, a data driver 102, a gate driver 103, a power supply unit 105, a touch recognition processor 107, etc.

The liquid crystal display panel LCP includes a color filter array CFA and a thin film transistor (TFT) array TFTA with a liquid crystal layer interposed between them.

The TFT array TFTA includes a plurality of gate lines G1, G2, G3, . . . , Gm-1, and Gm, which are formed parallel to one another on a first substrate SUBS1 in a first direction (for example, a x-axis direction), a plurality of data lines D1, D2, D3, . . . , Dn-1, and Dn, which are formed parallel to one another in a second direction (for example, a y-axis direction) to cross the plurality of gate lines G1, G2, G3, . . . , Gm-1, and Gm, TFTs respectively formed at crossings of the gate lines G1, G2, G3, . . . , Gm-1, and Gm and the data lines D1, D2, D3, . . . Dn-1, and Dn, a plurality of pixel electrodes P for charging a data voltage in liquid crystal cells, a common electrode COM positioned opposite the plurality of pixel electrodes P, etc.

The color filter array CFA includes black matrixes and color filters, which are formed on a second substrate SUBS2. Polarizing plates POL1 and POL2 are respectively attached to the first substrate SUBS1 and the second substrate SUBS2 of the liquid crystal display panel LCP. Alignment layers for setting a pre-tilt angle of liquid crystals are respectively formed on the inner surfaces of the first substrate SUBS1 and the second substrate SUBS2 contacting the liquid crystals. A column spacer may be formed between the first substrate SUBS1 and the second substrate SUBS2 to keep cell gaps of the liquid crystal cells constant.

A backlight unit (not shown) is disposed under the TFT array TFTA. The backlight unit includes a plurality of light sources to thereby uniformly irradiate light onto the TFT array TFTA and the color filter array CFA. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED).

The common electrode COM is formed on the second substrate SUBS2 in a vertical electric field driving manner such as a twisted nematic (TN) mode and a vertical alignment (VA) mode. Further, the common electrode COM is formed on the first substrate SUBS1 along with the pixel electrodes P in a horizontal electric field driving manner such as an in-plane switching (IPS) mode and a fringe field switching (FFS) mode. The embodiment of the invention describes the common electrode COM in the horizontal electric field driving manner as an example.

As shown in FIG. 3, the common electrode COM according to the embodiment of the invention includes a plurality of touch driving electrodes T11, T12, T13, T21, T22, and T23 and a plurality of touch sensing electrodes R11, R12, R21, and R22 used to constitute a touch sensor. Each of the touch driving electrodes T11, T12, T13, T21, T22, and T23 and each of the touch sensing electrodes R11, R12, R21, and R22 have the size corresponding to the several pixel electrodes P or the several tens of pixel electrodes P. Further, the size of each of the touch driving electrodes T11, T12, T13, T21, T22, and T23 is greater than the size of each of the touch sensing electrodes R11, R12, R21, and R22. The pixel electrodes P are respectively formed in areas defined by crossings of the gate lines G1 to Gm and the data lines D1 to Dn.

The touch driving electrode T11 is connected to a first horizontal touch driving line Tx1 formed outside a display area in the x-axis direction through a first vertical touch driving line Ty11 arranged in the y-axis direction. The touch driving electrode T12 is connected to the first horizontal touch driving line Tx1 through a third vertical touch driving line Ty21 arranged in the y-axis direction. The touch driving electrode T13 is connected to the first horizontal touch driving line Tx1 through a fifth vertical touch driving line Ty31 arranged in the y-axis direction. The touch driving electrode T21 is connected to a second horizontal touch driving line Tx2 formed outside the display area in the x-axis direction through a second vertical touch driving line Ty12 arranged in the y-axis direction. The touch driving electrode T22 is connected to the second horizontal touch driving line Tx2 through a fourth vertical touch driving line Ty22 arranged in the y-axis direction. The touch driving electrode T23 is connected to the second horizontal touch driving line Tx2 through a sixth vertical touch driving line Ty32 arranged in the y-axis direction.

The touch sensing electrodes R11 and R21 are connected to a first horizontal touch sensing line Rx1 formed outside the display area in the x-axis direction through a first vertical touch sensing line Ry1 arranged in the y-axis direction. The touch sensing electrodes R12 and R22 are connected to a second horizontal touch sensing line Rx2 formed outside the display area in the x-axis direction through a second vertical touch sensing line Ry2 arranged in the y-axis direction.

The first and second horizontal touch driving lines Tx1 and Tx2 and the first and second horizontal touch sensing lines Rx1 and Rx2 are formed outside the display area of the touch sensor integrated type liquid crystal display. The lines Tx1, Tx2, Rx1, and Rx2 are connected to touch pads TPT1, TPT2, TPR1, and TPR2, respectively.

Referring again to FIG. 1, the gate driver 103 sequentially outputs a gate pulse (or a scan pulse) under the control of the timing controller 101 in a display mode. The gate driver 103 shifts a swing voltage of the gate pulse to a gate high voltage VGH and a gate low voltage VGL. The gate pulse output from the gate driver 103 is synchronized with the data voltage output from the data driver 102 and is sequentially supplied to the gate lines G1 to Gm. The gate high voltage VGH is equal to or greater than a threshold voltage of the TFT, and the gate low voltage VGL is less than the threshold voltage of the TFT. A plurality of gate driving integrated circuits (ICs) of the gate driver 103 may be connected to the gate lines G1 to Gm formed on the first substrate SUBS1 of the TFT array TFTA through a tape automated bonding (TAB) process. Alternatively, the gate driving ICs of the gate driver 103 may be directly formed on the first substrate SUBS1 of the TFT array TFTA along with pixels through a gate-in-panel (GIP) process.

The data driver 102 samples and latches digital video data RGB under the control of the timing controller 101. The data driver 102 converts the digital video data RGB into positive and negative gamma compensation voltages GMA1 to GMAn and inverts a polarity of the data voltage. The positive and negative data voltages output from the data driver 102 are synchronized with the gate pulses output from the gate driver 103. A plurality of source driving ICs of the data driver 102 may be connected to the data lines D1 to Dn formed on the first substrate SUBS1 of the TFT array TFTA through a chip-on glass (COG) process or the TAB process. The source driving ICs may be integrated inside the timing controller 101 and thus may be implemented as a single chip IC along with the timing controller 101.

The timing controller 101 generates timing control signals for controlling operation timings of the gate driver 103 and the data driver 102 using timing signals Vsync, Hsync, DE, and MCLK, which are received from the external host controller 100 and are used to drive the touch sensor integrated type liquid crystal display. The timing control signals include a gate timing control signal for controlling the operation timing of the gate driver 103 and a data timing control signal for controlling the operation timing of the data driver 102 and the polarity of the data voltage.

The gate timing control signal includes a gate start pulse GSP, a gate shift clock GSC, a gate output enable GOE, and the like. The gate start pulse GSP is applied to a first gate driving IC of the gate driver 103 to output a first gate pulse in each frame period and controls a shift start timing of the first gate driving IC. The gate shift clock GSC is commonly input to the gate driving ICs of the gate driver 103 and also shifts the gate start pulse GSP. The gate output enable GOE controls output timings of the gate driving ICs of the gate driver 103.

The data timing control signal includes a source start pulse SSP, a source sampling clock SSC, a polarity control signal POL, a source output enable SOE, and the like. The source start pulse SSP is applied to a first source driving IC of the data driver 102 to firstly sample the data and controls a data sampling start timing. The source sampling clock SSC controls a sampling timing of data inside the source driving ICs based on a rising or falling edge thereof The polarity control signal POL controls the polarity of the data voltage output from the source driving ICs. The source output enable SOE controls output timings of the source driving ICs. If the digital video data RGB is input to the data driver 102 through a mini low voltage differential signaling (LVDS) interface, the source start pulse SSP and the source sampling clock SSC may be omitted.

The power supply unit 105 is implemented as a DC-DC converter including a pulse width modulation (PWM) circuit, a boost converter, a regulator, a charge pump, a voltage divider, an operational amplifier, etc. The power supply unit 105 regulates a voltage input from the host controller 100 and generates voltages required to drive the liquid crystal display panel LCP, the data driver 102, the gate driver 103, the timing controller 101, and the backlight unit (not shown).

The voltages generated by the power supply unit 105 include a high potential power voltage VDD, the gate high voltage VGH, the gate low voltage VGL, a common voltage Vcom, positive and negative gamma reference voltages GMA1 to GMAn, a touch driving voltage Vtsp, and the like. The common voltage Vcom and the touch driving voltage Vtsp are selectively supplied to the common electrode COM under the control of the host controller 100. Alternatively, the common voltage Vcom and the touch driving voltage Vtsp may be selectively supplied to the common electrode COM under the control of the timing controller 101.

The host controller 100 transfers the digital video data RGB of an input image and the timing signals Vsync, Hsync, DE, and MCLK required to drive the touch sensor integrated type liquid crystal display to the timing controller 101 through an interface, such as the LVDS interface and a transition minimized differential signaling (TMDS) interface. When the touch sensor integrated type liquid crystal display is driven so as to display the image on its screen, the host controller 100 supplies the common voltage Vcom to the touch driving electrodes T11, T12, T13, T21, T22, and T23 and the touch sensing electrodes R11, R12, R21, and R22 through the touch pads TPT1, TPT2, TPR1, and TPR2. When the touch sensor integrated type liquid crystal display is driven for the touch recognition, the host controller 100 supplies a control signal Vin for controlling the power supply unit 105 to the power supply unit 105, so that the touch driving voltage Vtsp can be supplied to the touch driving electrodes T11, T12, T13, T21, T22, and T23 through the touch pads TPT1 and TPT2.

The touch recognition processor 107 is connected to the touch pads TPR1 and TPR2 connected to the horizontal touch sensing lines Rx1 and Rx2. The touch recognition processor 107 differentially amplifies a difference voltage between a voltage of an initial capacitance of each of the touch sensing electrodes R11, R12, R21, and R22 and a voltage of a touch capacitance of each of the touch sensing electrodes R11, R12, R21, and R22 after the touch operation. The touch recognition processor 107 then converts the result of a differential amplification into digital data. The touch recognition processor 107 decides a touch position based on a difference between the initial capacitance and the touch capacitance using a touch recognition algorithm and outputs touch coordinate data indicating the touch position to the host controller 100.

A relationship between touch electrodes (i.e., the touch driving electrodes) and the pixel electrodes and a line structure for connecting the touch electrodes in the touch sensor integrated type display device according to a first embodiment of the invention are described in detail below with reference to FIGS. 4, 5A, and 5B.

Figure 4:
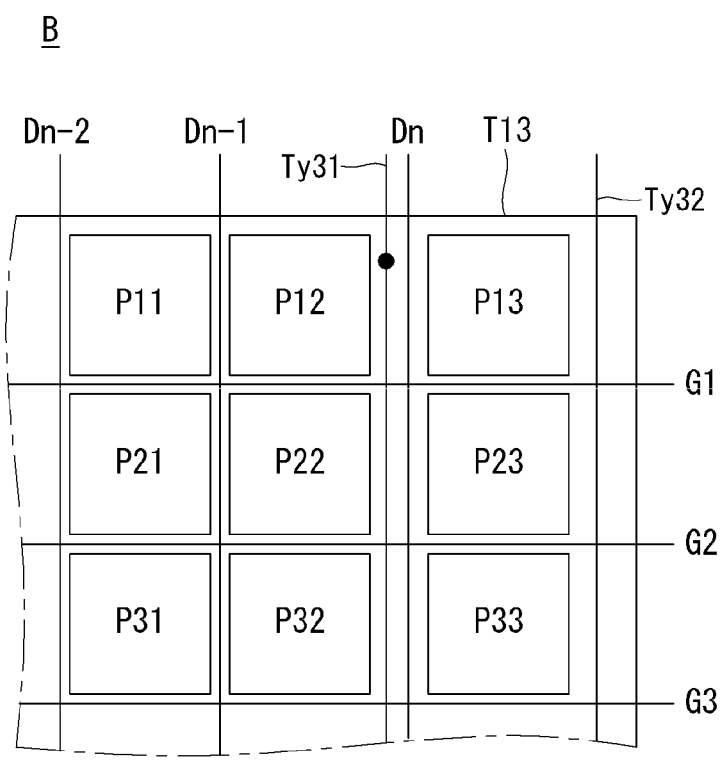
FIG. 4 is an enlarged view of a portion B shown in FIG. 3.

FIG. 4 is an enlarged view of a portion B shown in FIG. 3. FIG. 5A is an enlarged plane view of a partial area shown in FIG. 4 according to the first embodiment of the invention. FIG. 5B is a cross-sectional view taken along lines I-I' and II-II' shown in FIG. 5A.

In FIG. 4, reference symbols P11, P12, P13, P21, P22, P23, P31, P32, and P33 indicate pixel electrodes respectively formed in a plurality of pixel areas defined by the crossing of the gate lines G1, G2, and G3 and the data lines Dn-2, Dn-1, and Dn.

Figure 5A:
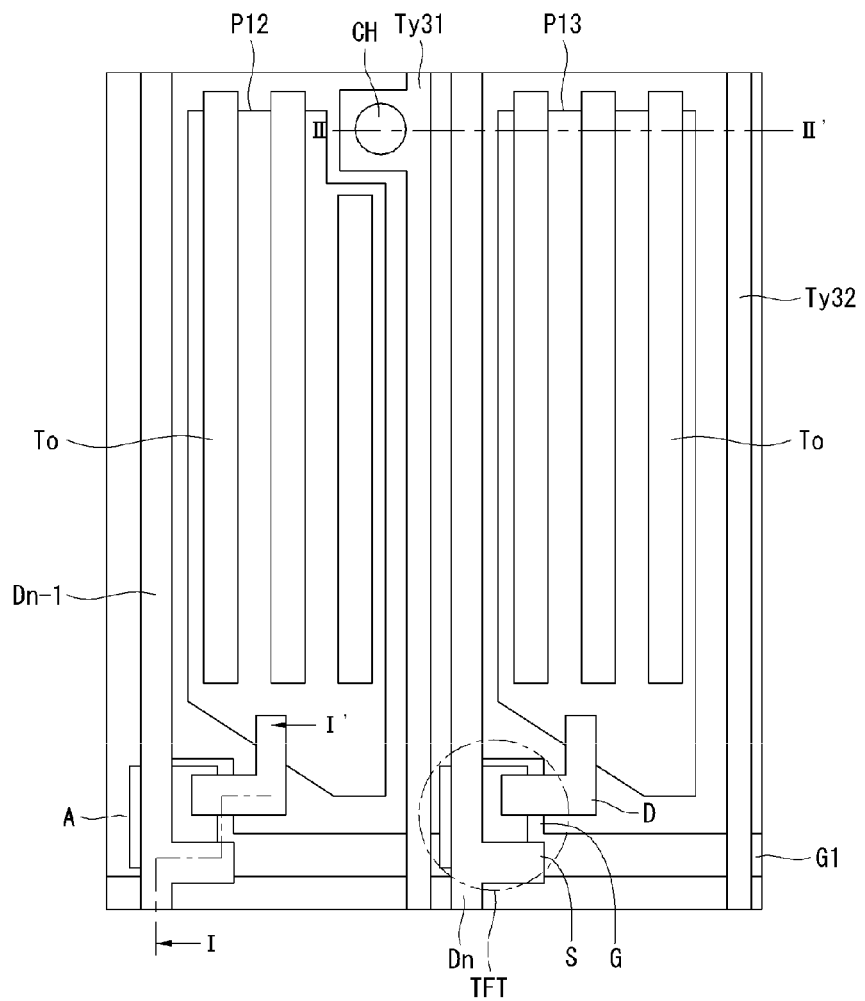
FIG. 5A is an enlarged plane view of a partial area shown in FIG. 4 according to a first embodiment of the invention.
Figure 5B:
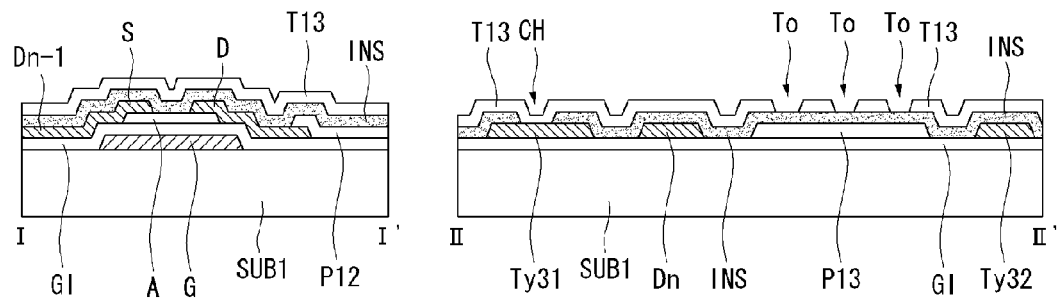
FIG. 5B is a cross-sectional view taken along lines I-I' and II-II' shown in FIG. 5A.

FIGS. 5A and 5B illustrate a pixel area, in which the vertical touch driving line Ty31 is formed, and another pixel area, in which the vertical touch driving line and Ty32 is formed. Other configurations may be used. For example, the two vertical touch driving lines Ty31 and Ty32 may be formed in one pixel area.

As shown in FIGS. 5A and 5B, the touch sensor integrated type display device according to the first embodiment of the invention includes the gate line G1 formed on the first substrate SUBS1 and a gate electrode G extending from the gate line G1.

Further, the touch sensor integrated type display device includes a gate insulating layer GI formed on the first substrate SUBS1 on which the gate line G1 having the gate electrode G is formed, and a semiconductor pattern A formed on the gate insulating layer GI so as to overlap a portion of the gate electrode G. The semiconductor pattern A constitutes an active region of a thin film transistor (TFT) to be described later.

Further, the touch sensor integrated type display device includes the data lines Dn-1 and Dn crossing the gate line G1 with the gate insulating layer GI interposed between the data lines Dn-1 and Dn and the gate line G1, and a TFT including a source electrode S extending from each of the data lines Dn-1 and Dn and a drain electrode D opposite to the source electrode S. Also the touch sensor integrated type display device includes the two vertical touch driving lines Ty31 and Ty32 separated from the data line Dn and formed parallel to the data line Dn, and the pixel electrodes P12 and P13 formed in an area defined by the crossing of the gate line G1, the data line Dn, and the vertical touch driving line Ty31 and connected to the drain electrodes Ds of the TFTs, respectively.

Further, the touch sensor integrated type display device includes an interlayer dielectric layer INS formed on an entire surface of the gate insulating layer GI on which the data lines Dn-1 and Dn, the TFT, and the pixel electrodes P12 and P13 are formed, and the common electrode (for example, the touch driving electrode T13) formed on the interlayer dielectric layer INS. The common electrode (for example, the touch driving electrode T13) is connected to the vertical touch driving line Ty31 through a contact hole CH passing through the interlayer dielectric layer INS. When the common electrode (for example, the touch driving electrode T13) has openings To as shown in FIGS. 5A and 5B, a vertical electric field as well as a horizontal electric field affects the liquid crystals when the voltage is applied to the pixel electrode and the common electrode. Hence, the driving of the liquid crystals may be controlled more precisely. Although not shown, the touch sensing electrode has the same configuration as the touch driving electrode.

Figure 6A:
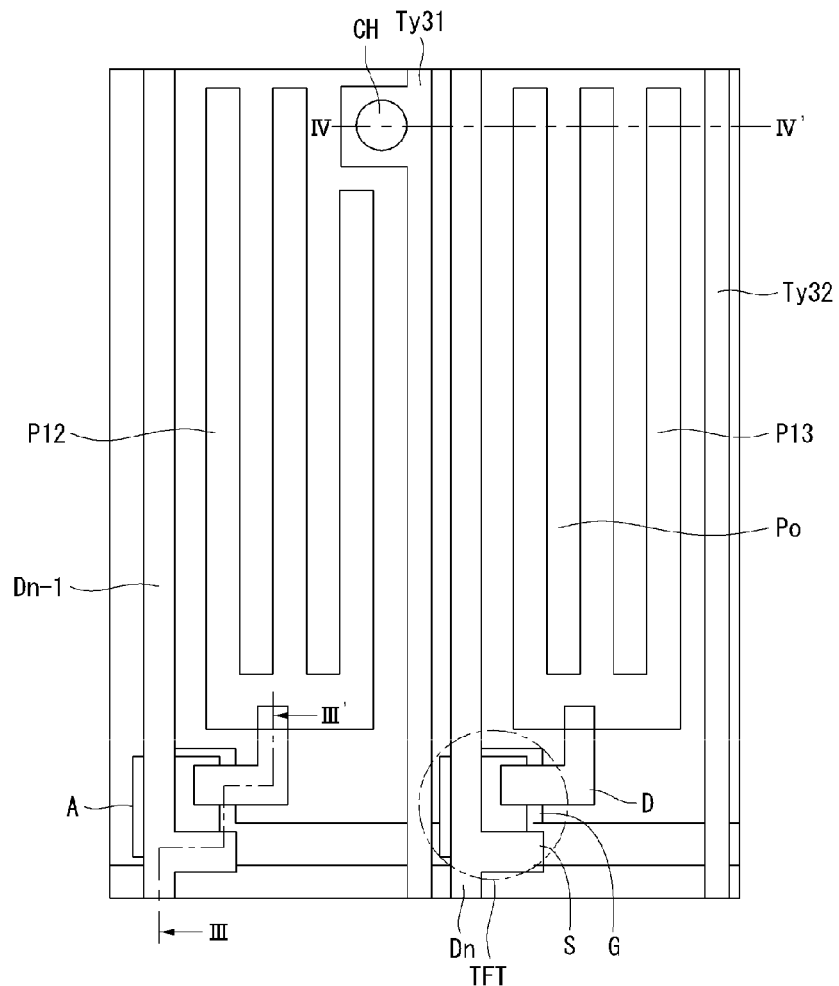
FIG. 6A is an enlarged plane view of a partial area shown in FIG. 4 according to a second embodiment of the invention.
Figure 6B:
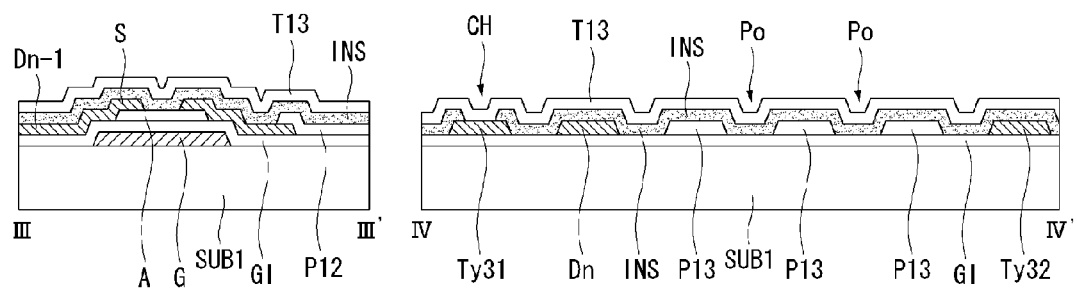
FIG. 6B is a cross-sectional view taken along lines III-III' and IV-IV' shown in FIG. 6A.

FIG. 6A is an enlarged plane view of a partial area shown in FIG. 4 according to a second embodiment of the invention. FIG. 6B is a cross-sectional view taken along lines III-III' and IV-IV' shown in FIG. 6A.

FIGS. 6A and 6B illustrate a pixel area, in which the vertical touch driving line Ty31 is formed, and another pixel area, in which the vertical touch driving line Ty32 is formed, in the same manner as FIGS. 5A and 5B. Other configurations may be used. For example, the two vertical touch driving lines Ty31 and Ty32 may be formed in one pixel area.

As shown in FIGS. 6A and 6B, the touch sensor integrated type display device according to the second embodiment of the invention includes the gate line G1 formed on the first substrate SUBS1 and a gate electrode G extending from the gate line G1.

Further, the touch sensor integrated type display device includes a gate insulating layer GI formed on the first substrate SUBS1, on which the gate line G1 having the gate electrode G is formed, and a semiconductor pattern A is formed on the gate insulating layer GI so as to overlap a portion of the gate electrode G. The semiconductor pattern A constitutes an active region of a TFT to be described later.

Further, the touch sensor integrated type display device includes the data lines Dn-1 and Dn crossing the gate line G1 with the gate insulating layer GI interposed between the data lines Dn-1 and Dn and the gate line G1, and a TFT including a source electrode S extending from each of the data lines Dn-1 and Dn and a drain electrode D opposite to the source electrode S. Also the touch sensor integrated type display device includes the two vertical touch driving lines Ty31 and Ty32 separated from the data line Dn and formed parallel to the data line Dn, and the pixel electrodes P12 and P13 formed in an area defined by the crossing of the gate line G1, the data line Dn, and the vertical touch driving line Ty31 and connected to the drain electrodes Ds of the TFTs, respectively. When each of the pixel electrodes P12 and P13 has openings Po as shown in FIGS. 6A and 6B, the vertical electric field as well as the horizontal electric field affects the liquid crystals when the voltage is applied to the pixel electrode and the common electrode. Hence, the driving of the liquid crystals may be controlled more precisely.

Further, the touch sensor integrated type display device includes an interlayer dielectric layer INS formed on an entire surface of the gate insulating layer GI, on which the data lines Dn-1 and Dn, the TFT, and the pixel electrodes P12 and P13 are formed, and the common electrode (for example, the touch driving electrode T13) formed on the interlayer dielectric layer INS. The common electrode (for example, the touch driving electrode T13) is connected to the vertical touch driving line Ty31 through a contact hole CH passing through the interlayer dielectric layer INS.

A relationship between touch electrodes (i.e., the touch sensing electrodes) and the pixel electrodes and a line structure for connecting the touch electrodes in the touch sensor integrated type display device according to a first embodiment of the invention are described in detail below with reference to FIGS. 7, 8A, and 8B.

Figure 7:
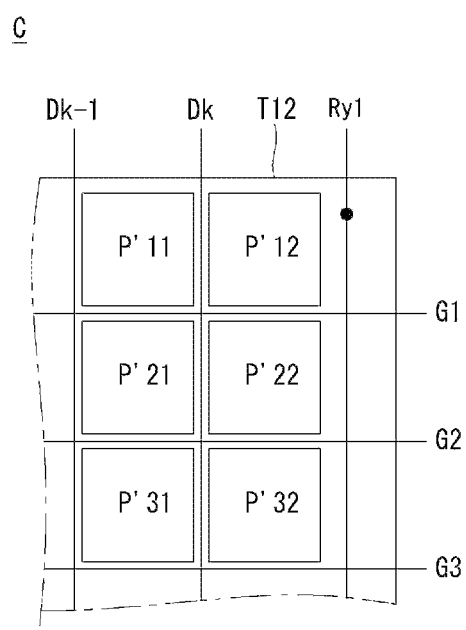
FIG. 7 is an enlarged plane view of a portion C shown in FIG. 3.

FIG. 7 is an enlarged view of a portion C shown in FIG. 3. FIG. 8A is an enlarged plane view of a partial area shown in FIG. 7 according to the first embodiment of the invention. FIG. 8B is a cross-sectional view taken along lines V-V' and VI-VI' shown in FIG. 8A.

In FIG. 7, reference symbols P'11, P'12, P'21, P'22, P'31, and P'32 indicate pixel electrodes respectively formed in a plurality of pixel areas defined by the crossing of the gate lines G1, G2, and G3 and data lines Dk-1 and Dk.

Figure 8A:
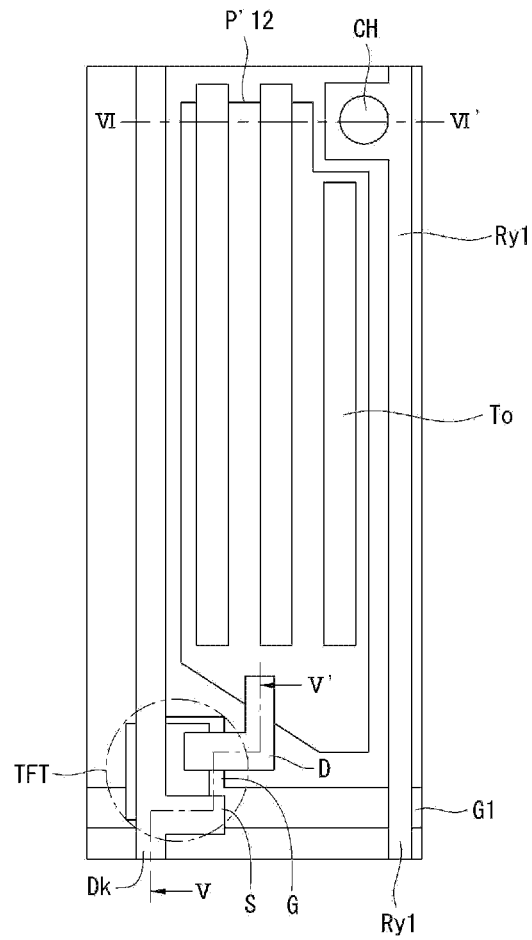
FIG. 8A is an enlarged plane view of a partial area shown in FIG. 7 according to a first embodiment of the invention.
Figure 8B:
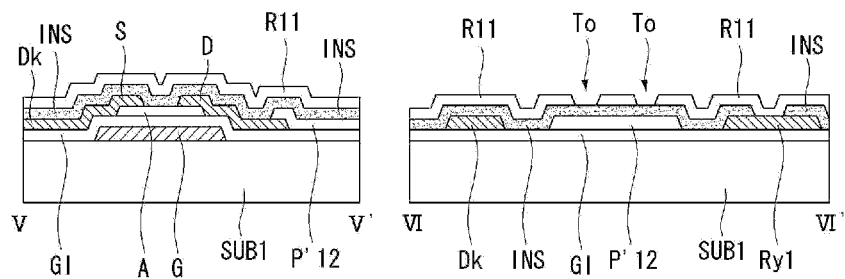
FIG. 8B is a cross-sectional view taken along lines V-V' and VI-VI' shown in FIG. 8A.

As shown in FIGS. 8A and 8B, the touch sensor integrated type display device according to the first embodiment of the invention includes the gate line G1 formed on the first substrate SUBS1 and a gate electrode G extending from the gate line G1.

Further, the touch sensor integrated type display device includes a gate insulating layer GI formed on the first substrate SUBS1 on which the gate line G1 having the gate electrode G is formed, and a semiconductor pattern A formed on the gate insulating layer GI so as to overlap a portion of the gate electrode G. The semiconductor pattern A constitutes an active region of a TFT to be described later.

Further, the touch sensor integrated type display device includes the data line Dk crossing the gate line G1 with the gate insulating layer GI interposed between the data line Dk and the gate line G1, and a TFT including a source electrode S extending from the data line Dk and a drain electrode D opposite to the source electrode S. Also the touch sensor integrated type display device includes the vertical touch sensing line Ry1 separated from the data line Dk and formed parallel to the data line Dk, and the pixel electrode P'12 formed in an area defined by the crossing of the gate line G1, the data line Dk, and the vertical touch sensing line Ry1 and connected to the drain electrode D of the TFT.

Further, the touch sensor integrated type display device includes an interlayer dielectric layer INS formed on an entire surface of the gate insulating layer GI, on which the data line Dk, the TFT, and the pixel electrode P'12 are formed, and the common electrode (for example, the touch sensing electrode R11) formed on the interlayer dielectric layer INS. The common electrode (for example, the touch sensing electrode R11) is connected to the vertical touch sensing line Ry1 through a contact hole CH passing through the interlayer dielectric layer INS. When the common electrode (for example, the touch sensing electrode R11) has openings To as shown in FIGS. 8A and 8B, a vertical electric field as well as a horizontal electric field affects the liquid crystals when the voltage is applied to the pixel electrode and the common electrode. Hence, the driving of the liquid crystals may be controlled more precisely.

Figure 9A:
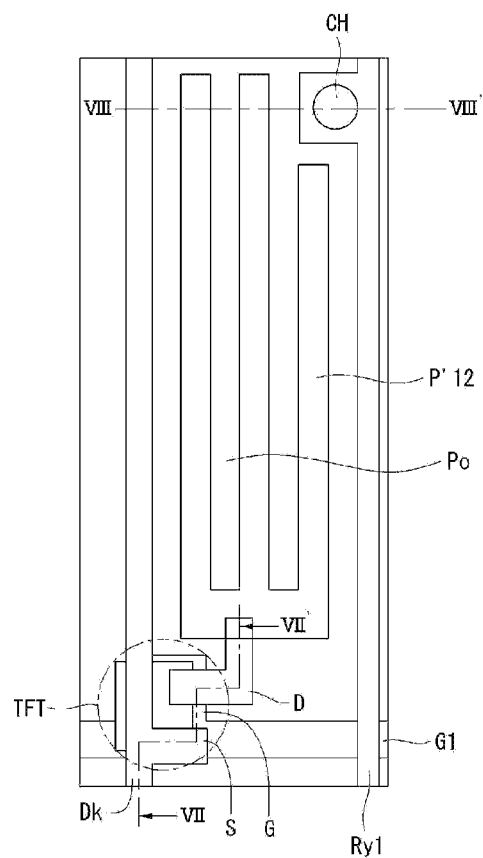
FIG. 9A is an enlarged plane view of a partial area shown in FIG. 7 according to a second embodiment of the invention.
Figure 9B:
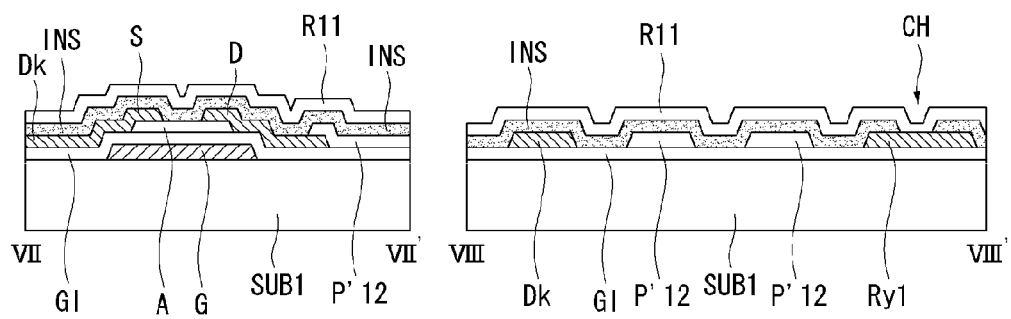
FIG. 9B is a cross-sectional view taken along lines VII-VII' and VIII-VIII' shown in FIG. 9A.

FIG. 9A is an enlarged plane view of a partial area shown in FIG. 7 according to a second embodiment of the invention. FIG. 9B is a cross-sectional view taken along lines VII-VII' and VIII-VIII' shown in FIG. 9A.

As shown in FIGS. 9A and 9B, the touch sensor integrated type display device according to the second embodiment of the invention includes the gate line G1 formed on the first substrate SUBS1 and a gate electrode G extending from the gate line G1.

Further, the touch sensor integrated type display device includes a gate insulating layer GI formed on the first substrate SUBS1 on which the gate line G1 having the gate electrode G is formed, and a semiconductor pattern A formed on the gate insulating layer GI so as to overlap a portion of the gate electrode G. The semiconductor pattern A constitutes an active region of a TFT to be described later.

Further, the touch sensor integrated type display device includes the data line Dk crossing the gate line G1 with the gate insulating layer GI interposed between the data line Dk and the gate line G1, and a TFT including a source electrode S extending from the data line Dk and a drain electrode D opposite to the source electrode S. Also the touch sensor integrated type display device includes the vertical touch sensing line Ry1 separated from the data line Dk and formed parallel to the data line Dk, and the pixel electrode P'12 formed in an area defined by the crossing of the gate line G1, the data line Dk, and the vertical touch sensing line Ry1 and connected to the drain electrode D of the TFT. When the pixel electrode P'12 has openings Po as shown in FIGS. 9A and 9B, a vertical electric field as well as a horizontal electric field affects the liquid crystals when the voltage is applied to the pixel electrode and the common electrode. Hence, the driving of the liquid crystals may be controlled more precisely.

Further, the touch sensor integrated type display device includes an interlayer dielectric layer INS formed on an entire surface of the gate insulating layer GI on which the data line Dk, the TFT, and the pixel electrode P'12 are formed, and the common electrode (i.e., the touch sensing electrode R11) formed on the interlayer dielectric layer INS. The common electrode (i.e., the touch sensing electrode R11) is connected to the vertical touch sensing line Ry1 through a contact hole CH passing through the interlayer dielectric layer INS.

As described above, because the touch sensor integrated type display device according to the embodiment of the invention includes the touch sensor for recognizing the touch operation as the component of the display device, the thickness of the display device may be reduced and the durability of the display device may be improved.

In the touch sensor integrated type display device according to the embodiment of the invention, the vertical touch driving lines Ty11, Ty12, Ty21, Ty22, Ty31, and Ty32 for connecting the touch driving electrodes T11, T12, T13, T21, T22, and T23 and the vertical touch sensing lines Ry1 and Ry2 for connecting the touch sensing electrodes R11, R12, R21, and R22 are formed on the same layer level, and the vertical touch driving lines Ty11, Ty12, Ty21, Ty22, Ty31, and Ty32 and the vertical touch sensing lines Ry1 and Ry2 are formed in the display area not to cross each other. Hence, the line structure of the display device is simple and the design of the TFT array is simple. Further, because the vertical touch driving lines Ty11, Ty12, Ty21, Ty22, Ty31, and Ty32 and the vertical touch sensing lines Ry1 and Ry2 are formed in the y-axis direction, the separate space for the lines on the left and right sides is not necessary. As a result, the bezel width of the touch sensor integrated type display device may be reduced.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. For example, the x-axis direction and the y-axis direction are the opposite directions and may be reversed. The size, the shape, and the number of the touch driving electrodes and the touch sensing electrodes constituting the common electrode may be changed. Further, the position of the touch driving lines connected to the touch driving electrodes and the position of the touch sensing lines connected to the touch sensing electrodes may be changed. In addition to variations and modifications in the component parts and/or arrangements, alternative uses will also be apparent to those skilled in the art.

What is claimed is:

1. A touch sensor integrated type display device comprising:
    gate lines and data lines, which are formed on a substrate to cross over each other;
    a plurality of pixel electrodes formed in areas defined by the crossing of the gate lines and the data lines;
    a common electrode including at least two touch driving electrodes, which overlap the plurality of pixel electrodes with an insulating layer interposed between them, and at least one touch sensing electrode, which is disposed adjacent to the at least two touch driving electrodes;
    first signal lines which are respectively connected to the at least two touch driving electrodes and are all arranged parallel to one another in a first direction, each of the first signal lines being connected to a different one of the at least two touch driving electrodes in the first direction; and
    a second signal line which is connected to the at least one touch sensing electrode and is arranged parallel to the first signal lines in the first direction.

2. The touch sensor integrated type display device of claim 1, further comprising:
    a third signal line which is formed in a second direction crossing the first signal lines and is connected to the first signal lines; and
    a fourth signal line which is formed parallel to the third signal line and is connected to the second signal line.

3. The touch sensor integrated type display device of claim 2, further comprising touch pads respectively connected to the third and fourth signal lines.

4. The touch sensor integrated type display device of claim 1, wherein the at least two touch driving electrodes and the at least one touch sensing electrode each have a size corresponding to at least two pixel electrodes.

5. The touch sensor integrated type display device of claim 1, wherein the pixel electrode includes a plurality of openings, which elongate in an area overlapping the touch driving electrode and the touch sensing electrode to be spaced apart from at a predetermined distance.

6. The touch sensor integrated type display device of claim 1, wherein the touch driving electrode and the touch sensing electrode each includes a plurality of openings, which elongate in an area overlapping the pixel electrode to be spaced apart from at a predetermined distance.

7. A touch sensor integrated type display device comprising:
    a gate line formed on a substrate;
    a gate insulating layer formed on the substrate to cover the gate line;
    a data line which is formed directly on the gate insulating layer to cross over the gate line;
    a thin film transistor having a source electrode and a drain electrode formed directly on the gate insulating layer, the source electrode connected to the data line;
    a plurality of first signal lines which are formed directly on the gate insulating layer without contacting the data line;
    a pixel electrode which is formed directly on the gate insulating layer in an area defined by the crossing of the gate line and the data line and is connected to a drain electrode of the thin film transistor without contacting the plurality of first signal lines;
    an interlayer dielectric layer formed on the gate insulating layer to cover the data line, the thin film transistor, the plurality of first signal lines, and the pixel electrode; and
    a common electrode which is formed on the interlayer dielectric layer and is connected to the plurality of first signal lines through a contact hole formed on the interlayer dielectric layer,
    wherein the common electrode includes at least two touch driving electrodes and at least one touch sensing electrode, wherein the plurality of first signal lines include touch driving signal lines connected to the at least two touch driving electrodes and are arranged parallel to one another in a first direction, and a touch sensing line connected to the at least one touch sensing electrode.

8. The touch sensor integrated type display device of claim 7, further comprising:
  a second signal line, which is formed in a second direction crossing the plurality of first signal lines and is connected to the touch driving signal lines; and
  a third signal line, which is formed parallel to the second signal line and is connected to the touch sensing line.

9. The touch sensor integrated type display device of claim 7, wherein the at least two touch driving electrodes and the at least one touch sensing electrode each have a size corresponding to at least two pixel electrodes.

10. The touch sensor integrated type display device of claim 7, wherein the pixel electrode includes a plurality of openings, which elongate in an area overlapping the touch driving electrode and the touch sensing electrode to be spaced apart from at a predetermined distance.

11. The touch sensor integrated type display device of claim 7, wherein the touch driving electrode and the touch sensing electrode each includes a plurality of openings, which elongate in an area overlapping the pixel electrode to be spaced apart from at a predetermined distance.

12. The touch sensor integrated type display device of claim 1, wherein the first signals lines and the second signal line are formed on a same layer in a display area of the display device so as to not cross each other.

13. The touch sensor integrated type display device of claim 2, wherein the third signal line and the fourth signal line are formed outside a display area of the display device.

14. The touch sensor integrated type display device of claim 7, wherein the first signal lines are arranged parallel to one another and formed on a same layer in a display area of the display device so as to not cross each other.

15. The touch sensor integrated type display device of claim 8, wherein the second signal line and the third signal line are formed outside a display area of the display device.

16. The touch sensor integrated type display device of claim 1, wherein
  during a display time, the display device is configured to apply a common voltage to the first signal lines and the second signal line; and
  during a touch recognition time, the display device is configured to apply a touch driving voltage to the first signal lines and to sense, via the second signal line, a voltage of the at least one touch sensing electrode.

17. The touch sensor integrated type display device of claim 1, wherein the first signal lines are arranged only in the first direction.

* * * * *